J. M. BOYLE.
ANGLE MEASURING AND SURVEYING INSTRUMENT.
APPLICATION FILED OCT. 16, 1918.

1,366,308. Patented Jan. 18, 1921.

Fig. 4.

J. M. BOYLE.
ANGLE MEASURING AND SURVEYING INSTRUMENT.
APPLICATION FILED OCT. 16, 1918.

1,366,308.

Patented Jan. 18, 1921.
7 SHEETS—SHEET 4.

Fig. 5.

Inventor
James M. Boyle
Maj. Ord. Dept. U.S.A.

J. M. BOYLE.
ANGLE MEASURING AND SURVEYING INSTRUMENT.
APPLICATION FILED OCT. 16, 1918.

1,366,308. Patented Jan. 18, 1921.
7 SHEETS—SHEET 6.

UNITED STATES PATENT OFFICE.

JAMES M. BOYLE, OF THE UNITED STATES ARMY.

ANGLE-MEASURING AND SURVEYING INSTRUMENT.

1,366,308.　　　　Specification of Letters Patent.　　Patented Jan. 18, 1921.

Application filed October 16, 1918.　Serial No. 258,396.

(FILED UNDER THE ACT OF MARCH 3, 1883, 22 STAT. L., 625.)

*To all whom it may concern:*

Be it known that I, JAMES M. BOYLE, major, Ordnance Dept., U. S. A., a citizen of the United States, stationed at Washington, D. C., have invented an Improvement in Angle-Measuring and Surveying Instruments, of which the following is a specification.

The invention described herein may be used by the Government, or any of its officers or employees in prosecution of work for the Government, or by any other person in the United States, without payment of any royalty thereon.

The present invention relates to improvements in instruments for measuring angles and more particularly to those adapted for use in determining the angular position of moving targets, as in anti-aircraft gunnery.

It is contemplated that, by the use of the instrument hereinafter described, the path of an image of a moving target may be defined and sufficient data obtained from which to calculate a future position of said target in azimuth and elevation. With this and other data, suitable information may be provided for controlling the fire of anti-aircraft artillery which may be stationed in any convenient position with respect to the angle measuring or surveying instrument.

For convenience of operation, the present instrument is preferably contained within a camera obscura, with the parts so arranged and adjusted that an image or other visible marker of the position of a rapidly moving target may be intercepted on a suitable surface. Coöperating with this surface are scales, preferably calibrated in mils, and adapted to give readings of the position of said image or marker in azimuth and elevation. The image or marker transmitting mechanism is preferably freely movable in such a manner that the direction of the moving target may be reproduced and indicated on the aforesaid surface, a portion of which may be covered by a suitable chart adapted to fit thereon and provided with a longitudinally extending line which, when the chart is in position forms an arc in a great circle of an imaginary sphere having its center in the optical center of the optical system by means of which the image or marker is produced. By manipulating the mechanism carrying the chart in proper relation to the movement of the image producing means, the center longitudinal line of said chart may be made to coincide substantially with the path of the image of the moving target.

At certain measured intervals of time during the passage of such an image along the longitudinal line of the chart, the range of the target may be determined and coördinated on a vector diagram with the angular position on the longitudinal line, thus disclosing an average range change per unit of time along the indicated probable path of the image. When two or more coördinations of range with angular positions have been made, a straight line extrapolated from points thus determined can be made across the vector diagram and will indicate the probable range changes of the target for a short period of time after the initial observations and readings have been made and the range position of the target image along the extrapolated line at the end of an arbitrarily chosen length of time may be indicated by laying off on said line the number of lineal units corresponding to the arbitrarily chosen length of time. The future position of the image of the plane along the central longitudinal line of the paper chart, corresponding to the position or point on the extrapolated range line on the vector diagram, established as just described, may be determined by an extension of the vector radius through the point established on the extrapolated range line of the vector diagram to the vector arc which is marked similarly to the longitudinal line on the chart and the point thus found may be located on the chart by reference to the vector scale readings and taken as the "hit point" or the graphic representation of the predetermined position in space at which it is intended to hit the target by artillery fire.

That portion of the longitudinal line on the chart representing an arc of a great circle, which includes the path of the image actually traversed and the contemplated path predetermined by the foregoing calculations, constitutes the graph of the target's course and of the length of time which it will take for the target to proceed from the point of first reading to the projected hit point. If this line is calibrated in units representing seconds or other suitable division, it will readily be seen that the operator can measure back from the hit point a distance representing the time of flight of a projectile for the range indicated and when the image of the target coincides with the point thus established, he can signal for the discharge of the artillery at the proper time for the projectile to reach the hit point.

Suitable mechanism may be provided for conveniently taking readings of elevation of the target, which, when used in conjunction with the range data and the vector diagram above referred to, permit calculation of the elevation of the predetermined hit point. Mechanism may also be provided for taking readings indicating the position of the target in azimuth. With the information thus obtained, and knowing the distance of the guns from the orienting device, the necessary corrections may be made in elevation and azimuth and the readings thus obtained furnish proper data for laying the guns in such position and direction that their projectiles will reach the target at the predetermined or "hit" point. Of course, other corrections may be necessary for drift and windage, and for variations in trajectory in high-angle fire.

One embodiment of my invention is illustrated in the drawings accompanying the present specifications, and in which:

Figs. 5, 6 and 7 illustrate a form of chart which may be attached to the chart carrying arm, Fig. 5, showing the record of a hit, Fig. 6 the record where a target goes off the course before fired upon, and Fig. 7, the record where target goes off the course after guns have been fired but before projectiles reach the predetermined hit point.

Figures 1, 3:
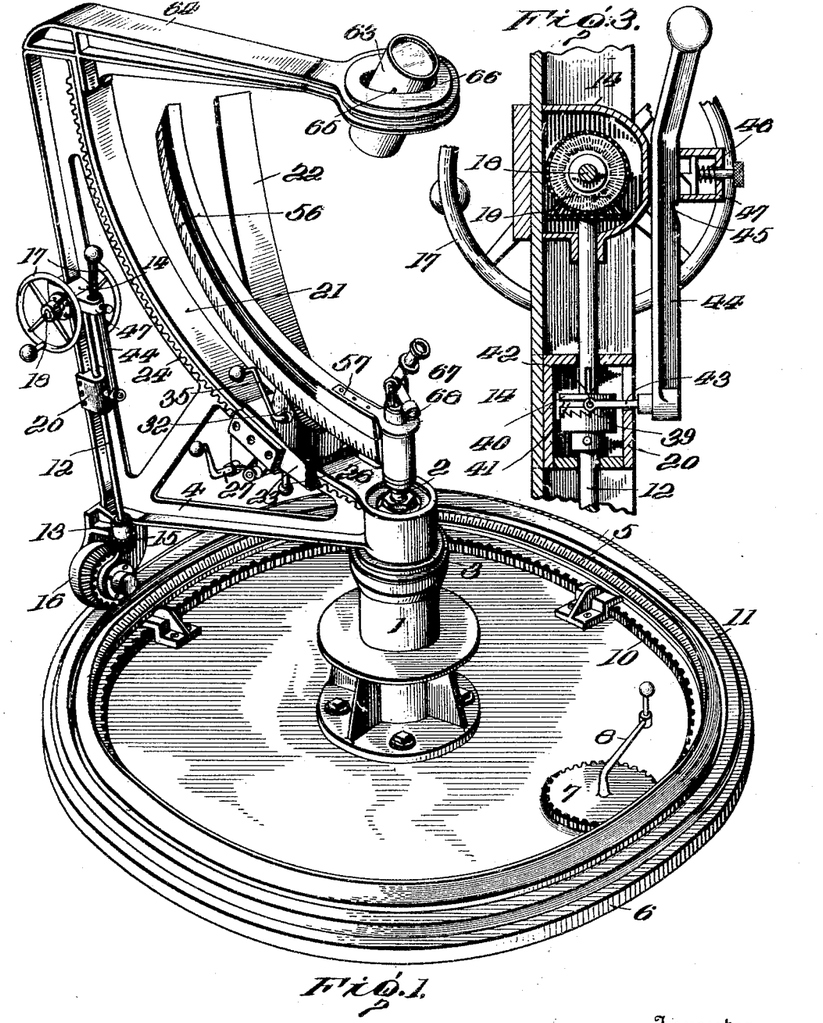
Figure 1 is a view in perspective of an angle measuring instrument.
Fig. 3 is a view in detail of the clutch mechanism adapted for use with the azimuth arm rotating mechanism.
Figure 2:
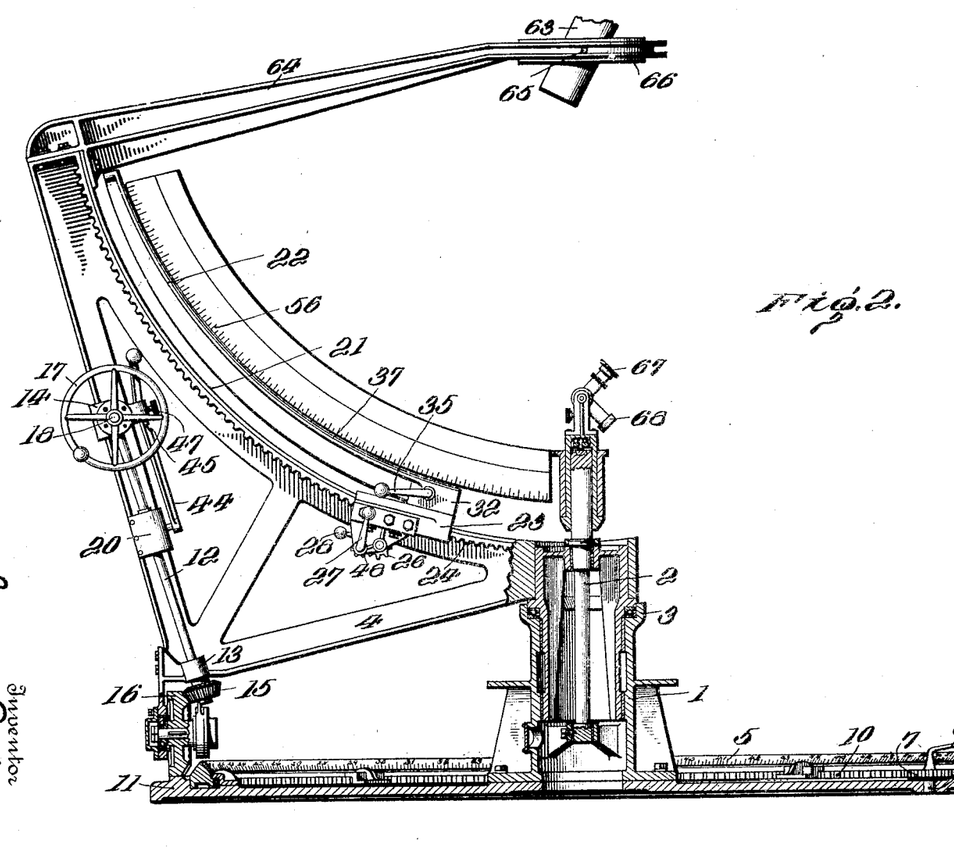
Fig. 2 is an elevation with portions broken away and other portions shown in vertical section.

Referring to Fig. 1, the illustrated embodiment of my invention may conveniently include a central supporting member 1 adapted to receive and support a vertical post 2. The supporting member 1 may be provided with a circular flanged portion 3 adapted to guide and support one end of an azimuth arm 4 which is mounted to rotate freely about the post 2. The free end of said arm may be equipped with suitable means for giving it motion of rotation with respect to an azimuth scale 5. This scale is concentric with post 2 and is preferably movable with respect to a fixed guide member or base 6 adapted to be fastened to a floor or other suitable supporting structure. As shown in Fig. 2, rotation of the azimuth scale 5 may conveniently be effected by means of a gear 7 fixed to a crank handle 8 which has one end journaled in a socket 9 in the base 6. The teeth of the gear 7 mesh with a rack 10 arranged on an inner portion of the azimuth scale support.

As shown more particularly in Fig. 2, the free end of the azimuth arm 4 is supported upon and movable with respect to the fixed supporting base 6 which is preferably provided with a track 11. A beveled wheel 16 journaled in a portion of the free end of the azimuth arm engages and runs upon the track 11, thus supporting said arm.

For convenience in operation and for the purpose of accurately controlling the movement of the azimuth arm 4 along said track, readily accessible means are provided for positively moving this arm, including, as shown in Figs. 2 and 3, a shaft 12, journaled in bracket 13 and housing 14 projecting from the azimuth arm. A beveled gear 15 is provided at the lower end of shaft 12 and positioned to engage corresponding teeth in the beveled wheel 16. As shown in Fig. 3, a hand wheel 17 may be provided at the upper end of shaft 12 to rotate a shaft 18 having a beveled gear at its inner end adapted to mesh with a corresponding beveled gear 19 fixed to the upper end of shaft 12. Similar mechanism for controlling rotation of the azimuth arm may be provided on the opposite side of said arm for the convenience of the operator. In instruments where it is contemplated that the azimuth arm will be moved through large arcs, the rotating power may be transmitted through a suitable clutch to the beveled gear 15. By throwing out said clutch, the azimuth arm may be pushed around from one position to another more rapidly than it could be moved by means of the shaft and gear propelling mechanism operated by the hand wheel.

As shown in Fig. 3, shaft 12 may comprise upper and lower, or driving and driven parts, the lower or driven part having a ratchet toothed collar 39 fixed at its upper end. The driving part is slotted at its lower end and carries a collar 40 slidable vertically thereon and rotatable with the shaft. This collar has a circumferential recess 41 adapted to receive inwardly extending pins 42 mounted in a yoke 43, said yoke being carried by a suitable clutch lever 44. To lock the clutch in disengaged position, a notch 45 may be provided in the lever 44, adapted to engage a spring pressed plunger 46 guided and supported in a suitable housing 47.

Figure 4:
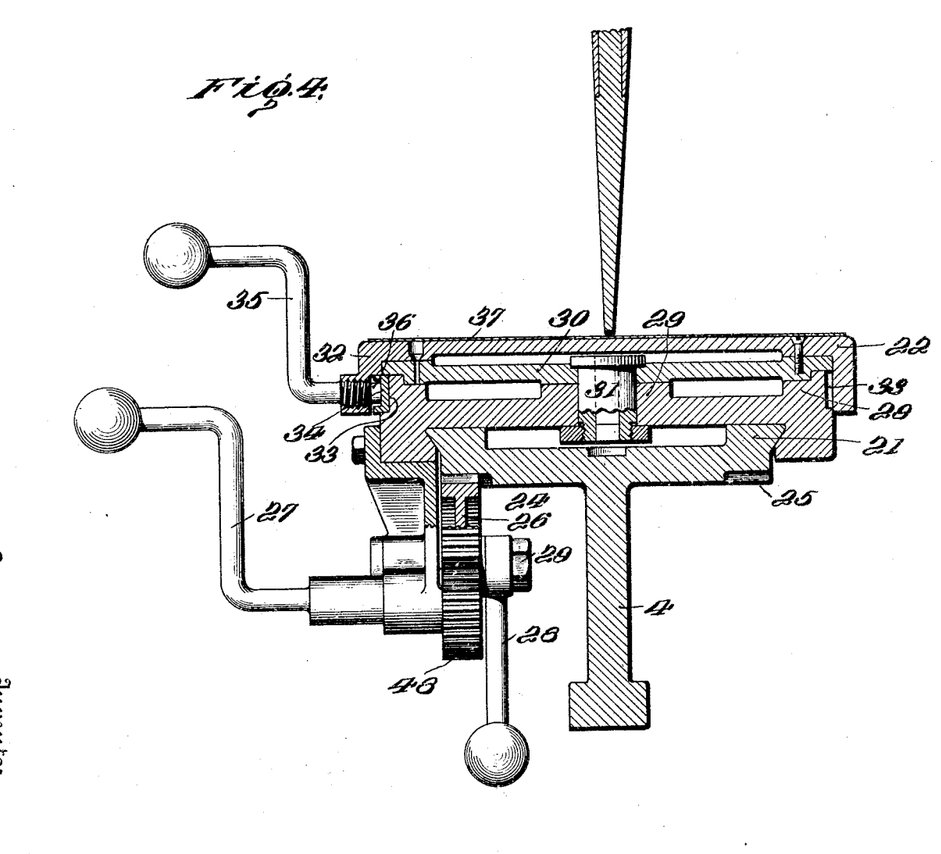
Fig. 4 illustrates in detail the construction of mechanism for moving the chart carrying arm along the azimuth arm and mechanism for pivotal mounting of said chart arm on the azimuth arm and means to lock the chart arm in any desired position.

As shown in Figs. 1 and 2, the azimuth arm 4 is provided with a curved flanged portion forming a track 21 adapted to support and guide a chart carrying member or arm 22 by means of a carriage 23. Racks 24 and 25 are preferably located on the under side of the track 21, as shown in Figs. 1 and 4, rack 24 being arranged to mesh with a gear 26 mounted on the carriage 23 and operable by means of a suitable crank 27 through a gear 48 to move the carriage 23 along the track 21. Means are provided to lock the carriage in any desired position and may include an arm 28 threaded upon a stud 29 which supports the gear 26 and upon which said gear is normally free to rotate. By tightening up on the arm 28, the gear 26 is jammed between the arm 28 and a relatively fixed portion of the carriage member 23.

The carriage 23 has circular bearing portions 29' projecting upwardly to rotatably support a similarly shaped table member 30 fixed to the arm 22. A centrally located pivot 31 retains the table member 30 in operative relation to the carriage member and permits free rotation of the table and of the chart carrying arm supported by said table. A portion of the arm 22 may form a circular housing arranged to inclose the pivotal mount just described and includes a peripheral depending flange 32 overlapping a circumferential recess 33 of the carriage 23 in which a clamp plate 34 is arranged to bear against the peripheral surface of said recess 33. A crank 35 has one end threaded in the depending flange 32, said end terminating in an inwardly projecting portion 36 which fits into a recess in the clamp plate 34, and carries the plate around with it when the arm is rotated. The inwardly projecting portion 36 also bears against the bottom of the recess in plate 34 when the crank is screwed inwardly and presses the said plate into frictional engagement with the upwardly projecting circular portion 29 of the carriage, thus permitting the arm 22, to be locked against rotation with respect to the carriage 23.

Figure 6:
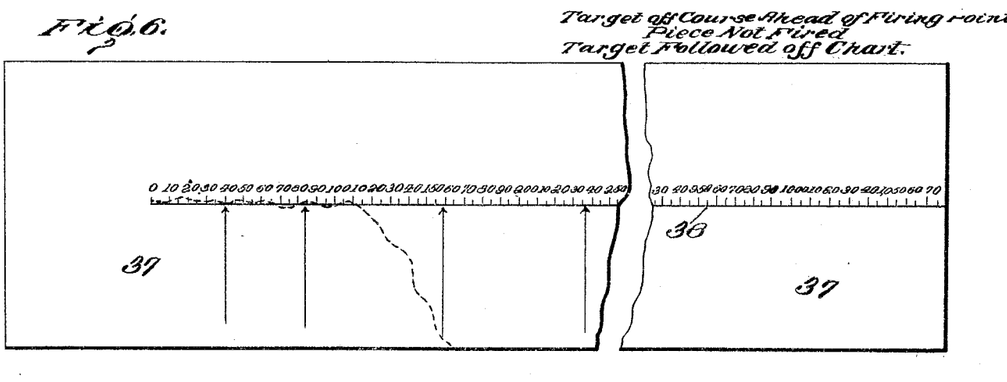
Figure 7:
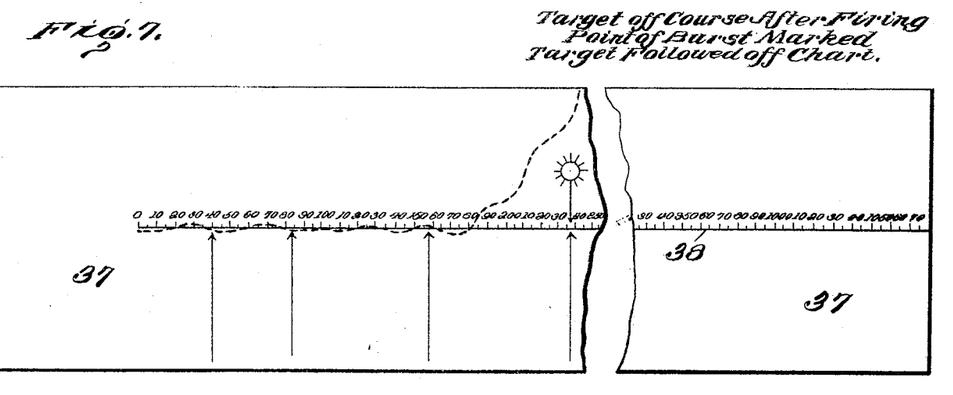

The chart arm 22 is adapted to receive and carry on its upper curved surface a chart 37 having a longitudinal line 38 which, when the chart is in operative position, forms an arc of a great circle in an imaginary sphere, preferably of 1.019 meters radius for practical purposes, and having its center at the optical center of an optical system hereinafter to be described. This line may be divided into parts representing increments of angular measurement, preferably mils. It is contemplated that the chart 37 shall be removable and that a new one shall be used for each observation or as often as necessary. As indicated in Fig. 5, a complete record of observation based on the use of the present instrument is shown in a case where the fire has been effective. Fig. 6 is a record showing that the target changed its course materially before the gun was fired and therefore made it necessary to secure new data before using ammunition. In Fig. 7, there is presented the record of a situation in which the target changed direction materially after the projectile was on its way. Accordingly, from these specimen records, it will be seen that valuable data is obtained in addition to the use to which the chart is put in the actual computation of firing data.

Figure 8:
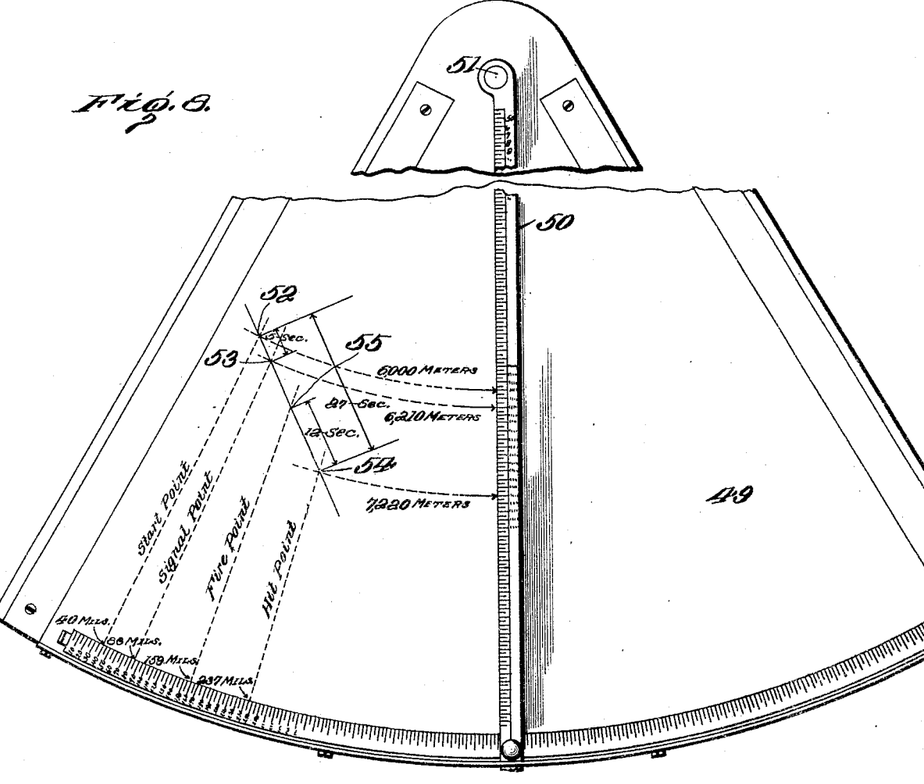
Fig. 8 shows a suitable form of sector board for use in connection with the orienting instrument and illustrates the graphic plotting of the hit point and the firing point to be indicated on the longitudinal line of the chart illustrated in Figs. 5, 6 and 7.

The system of computing firing data disclosed in connection with the present application contemplates the use of a vector diagram in addition to the angle measuring instrument herein described and suitable range finding means. A convenient form of sector board for this purpose is shown in Fig. 8. It may include a base 49 adapted to accommodate the representation of a segment of a circle preferably of the same diameter as the great circle of which the line 38 of chart 37 forms an arc, when in position on the platen 22. An angle measuring scale, preferably calibrated in mils, is positioned along the arc of the great circle of which the segment forms a part. A range arm 50 is pivotally mounted at 51 to move around the center of the circle and extends to the angle measuring scale at the periphery, being divided preferably into parts representing 10190 meters.

Figure 9:
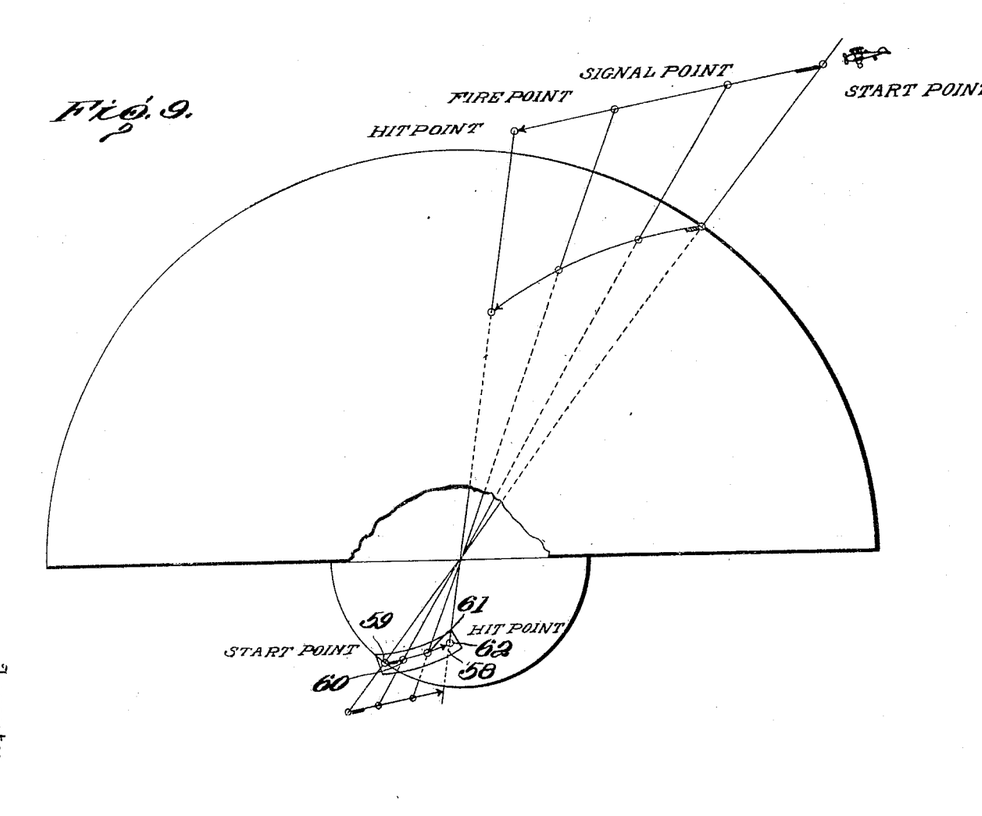
Fig. 9 is a diagram illustrating the application of the theory of operation of the present invention to a typical problem in which the moving target is shown as an airplane.

Fig. 9 shows various critical positions of the moving target, some of which are observed and some of which are calculated by use of the sector board just described. Thus, the starting point, shown in Fig. 9 corresponds to the point 52, Fig. 8, which is determined by a reading of elevation on the angle measuring instrument and a reading of range at the same instant on a range finding instrument. The point marked "Signal point" in Fig. 9 has its counterpart on the diagram of Fig. 8 at 53 and its position is ascertained by readings taken, as in the case of point 52 and at a measured interval of time after said readings. A line extrapolated from the two points thus established will indicate the probable future course of the target at least for a relatively short time. With the data thus available, it will readily be understood that the operator may arbitrarily establish along the extrapolated line a predetermined point, as 54, at which to hit the target and he may then measure back along the line the number of time units representing the time of flight of a projectile over the range indicated for the predetermined hit point. This gives the fire point 55.

The elevation readings referred to may be taken on the angle measuring instrument by means of an elevation scale 56 mounted on a rotatable arm 57, the scale being positioned to swing over and adjacent to the chart 37 when in position on the arm 22. This chart is also diagrammatically indicated at 58 in Fig. 9 and the critical positions of the image or marker traveling along said chart are indicated at 59, 60, 61 and 62 which positions correspond respectively to the positions 52, 53, 55 and 54 of the vector diagram, Fig. 8.

In producing the image referred to, any suitable means may be employed, as a pin hole or a photographic lens having the proper focal distance, in the present case, 1.019 meters. For this purpose, I show in Figs. 1 and 2, an optical system mounted in a suitable casing 63. The optical center of said system is also the center of the great circle of which the line 38, Fig. 5, forms a part when chart 37 is in operative position. The optical center of said system also lies in an extension of the axis of the base 1. The mounting 63 may be supported by any suitable means, shown in Figs. 1 and 2 as an arm 64 and is preferably capable of rotation and tilting with respect to said arm. For this purpose, trunnions 65 may be suitably journaled in a horizontally rotatable member 66. In the form shown, the features just described would permit the operator to follow continuously the course of a moving target at least above certain minimum angles of elevation in all points of azimuth.

The azimuth reading of the position of the target may be taken by means of a telescope 67 having its optical center in an extension of the axis of the base 1 and having an objective 68 pointed toward the azimuth scale 5. The telescope may conveniently be arranged to turn with the arm 57, the measuring edge 56 of said arm being positioned to lie in a vertical plane passing through the optical center of said telescope 67. Thus, when the edge or scale 56 cuts the image at any place along the chart arm 22, a reading taken through the telescope 67 will give the position in azimuth of the moving target. Similarly, when the predetermined position or hit point has been determined and plotted along the line 38 of chart 37, the arm 57 may be swung around to intersect the point thus established and the azimuth reading of the future position of the target may be communicated in advance to the guns, with or without corrections for windage, drift and other components of the path of the projectile, as circumstances may determine.

All the scales hereinabove referred to and relating to measurement of angles are preferably calibrated in mils as are the scales on the artillery used in connection with the described system of fire control. Where the instruments herein described are used with artillery, the zero of the azimuth scale will in each case be adjusted to parallelism or coincidence with the position of the zero of the corresponding scale of the gun or guns. If the instruments at the guns are not on the same level with the angle measuring instrument, an appropriate correction may be made in elevation readings communicated to the guns or the correction may be made at the guns. Both azimuth and elevation readings transmitted to the guns will be corrected for their difference in position.

The foregoing description and statement of method of operation of the instrument mentioned indicate only one field within which the present invention may be applied. Within this field it is contemplated that the firing data obtained by use of the devices described will make possible a more accurate and therefore more economical and effective anti-aircraft fire.

I claim as my invention—

1. In an angle measuring instrument, the combination of a chart having a line adapted to indicate the probable future course of an image, an optical system operatively arranged with respect to said chart, and means for measuring the elevation and azimuth of points along said line.

2. In an angle measuring instrument, the combination of an image intercepting surface adapted to receive a chart having a longitudinal line marked thereon forming an arc of a great circle of an imaginary sphere, an optical system for producing the image having its optical center at the center of the great circle, whereby the radial direction of the object is indicated by the location of the image produced on said chart.

3. In an angle measuring instrument, the combination of an azimuth scale, an elevation scale pivotally mounted and having its center of rotation lying in an extension of the central vertical axis of said azimuth scale, image transmitting means having its optical center lying in an extension of the vertical axis of said azimuth scale, and means for intercepting an image from said image transmitting means along a line adapted to be moved to intercepting position for determining the location of the image by the measuring line of the elevation scale.

4. In an angle measuring instrument, the combination of a central base member, an azimuth arm mounted thereon, a chart carrying arm movable along a portion of the azimuth arm, an optical system adapted to transmit an image to a chart on said chart carrying arm, and an elevation measuring arm mounted on the central base member and adapted to coöperate with said chart carrying arm to indicate elevation readings of points on said chart.

5. In an angle measuring instrument, the combination of a base, a circular azimuth scale rotatably mounted on said base, a rotatable azimuth arm having its center of rotation lying in an extension of the central vertical axis of said scale and carrying a supporting wheel adapted to travel on said base and means carried by said arm for rotating the wheel.

6. In an angle measuring instrument, the combination of a base, a rotatable circular azimuth scale disposed on said base, a rotatable azimuth arm having its center of rotation lying in an extension of the central vertical axis of said scale and carrying a supporting wheel adapted to travel on said base, and means carried by said arm for rotating the wheel comprising a rotatable shaft in two sections, coöperable clutch members carried by adjacent ends of said shaft and means for disengaging said clutch member.

7. In an angle measuring instrument, the combination of a base, a circular azimuth scale mounted for rotation on said base, an azimuth arm having its center of rotation lying in an extension of the central vertical axis of said scale, a carriage mounted on said arm and adapted to move longitudinally thereof, a chart carrying member pivotally mounted on said carriage and means for producing an image of the target on the chart carried by said member.

8. In an angle measuring instrument, the combination of a base, a circular azimuth scale mounted for rotation on said base, an azimuth arm having its center of rotation lying in an extension of the central vertical axis of said scale, a carriage mounted on said arm and adapted to move longitudinally thereof, a chart carrying member pivotally mounted on said carriage, means for producing an image of the target on the chart carried by said member and an elevation scale supporting arm mounted for rotation in juxtaposition to said member for indicating in suitable units the position of said image.

9. In an angle measuring instrument, the combination with a base, a circular azimuth scale mounted for rotation on said base, an azimuth arm having its center of rotation lying in an extension of the central vertical axis of said scale, said arm having a bent portion adapted to support an optical system, a member having a curved surface for receiving a chart having a longitudinal line marked thereon, said line forming an arc of a great circle in an imaginary sphere having its center at the optical center of said optical system and means for pivotally supporting said member on said arm.

10. In an angle measuring instrument, the combination of a base, a circular azimuth scale rotatably mounted on said base, a central supporting member secured to said base adapted to support a vertical post, an azimuth arm rotatably mounted on said member, a chart carrying member pivotally disposed on said arm, an elevation arm rotatably mounted on the post, a telescope for reading said azimuth scale adapted to rotate with said elevation arm, an optical system supported on the azimuth arm, the optical center of the optical system and telescope lying in the extension of the central vertical axis of said azimuth scale.

Signed at Washington, D. C., this 3rd day of October, 1918.

JAMES M. BOYLE.

Witness:
JOHN W. THOMPSON.